United States Patent
Kozaki et al.

(10) Patent No.: US 12,008,894 B2
(45) Date of Patent: Jun. 11, 2024

(54) ROADSIDE INFORMATION PROCESSING SYSTEM

(71) Applicant: MITSUBISHI ELECTRIC CORPORATION, Tokyo (JP)

(72) Inventors: Seiji Kozaki, Tokyo (JP); Kenichi Nakura, Tokyo (JP); Takeshi Suehiro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 816 days.

(21) Appl. No.: 17/083,555

(22) Filed: Oct. 29, 2020

(65) Prior Publication Data

US 2021/0074148 A1 Mar. 11, 2021

Related U.S. Application Data

(63) Continuation of application No. PCT/JP2018/021752, filed on Jun. 6, 2018.

(51) Int. Cl.
*G08G 1/01* (2006.01)
*B60W 40/04* (2006.01)
(Continued)

(52) U.S. Cl.
CPC ........... *G08G 1/0133* (2013.01); *B60W 40/04* (2013.01); *B60W 40/072* (2013.01);
(Continued)

(58) Field of Classification Search
CPC .. G08G 1/0133; G08G 1/0112; G08G 1/0116; H04W 4/44; B60W 40/04;
(Continued)

(56) References Cited

U.S. PATENT DOCUMENTS 6,654,681 B1 * 11/2003 Kiendl ................... G01C 21/26
701/119
9,384,659 B2 * 7/2016 Tsuda ............... G08G 1/096741
(Continued)

FOREIGN PATENT DOCUMENTS

JP 2003-319429 A 11/2003
JP 2008-536206 A 9/2008
(Continued)

OTHER PUBLICATIONS

Office Action dated Jan. 25, 2022 issued in corresponding Chinese Patent Application No. 201880094058.3 with English Translation.
(Continued)

*Primary Examiner* — Luis A Martinez Borrero
(74) *Attorney, Agent, or Firm* — BIRCH, STEWART, KOLASCH & BIRCH, LLP

(57) ABSTRACT

A roadside information processing system according to the present disclosure includes a plurality of roadside devices installed on a roadside of a road and capable of communicating with a vehicle travelling on the road, and a plurality of sensors installed on the roadside to perform sensing on the road and its periphery, wherein at least one of the roadside devices includes an edge-server processing unit to obtain first information from in-vehicle devices included in the vehicles and from some of the plurality of sensors, the first information indicating information about a periphery of the vehicles and about the road and its periphery, and to generate second information by using the first information, the second information indicating a position of the vehicles, a movement direction of the vehicles, and traffic jam conditions on the road.

13 Claims, 6 Drawing Sheets

(51) Int. Cl.
B60W 40/072 (2012.01)
H04W 4/44 (2018.01)

(52) U.S. Cl.
CPC ......... *G08G 1/0112* (2013.01); *G08G 1/0116* (2013.01); *H04W 4/44* (2018.02); *B60W 2520/06* (2013.01); *B60W 2552/20* (2020.02); *B60W 2554/406* (2020.02)

(58) Field of Classification Search
CPC ........... B60W 40/072; B60W 2552/20; B60W 2554/406; B60W 2520/06
See application file for complete search history.

(56) References Cited

U.S. PATENT DOCUMENTS

| | | | | |
|---|---|---|---|---|
| 9,922,553 | B2* | 3/2018 | McErlean | G08G 1/163 |
| 10,972,863 | B2* | 4/2021 | Futaki | H04W 4/06 |
| 2006/0206610 | A1 | 9/2006 | Ling et al. | |
| 2017/0257464 | A1 | 9/2017 | Mapes et al. | |
| 2018/0047287 | A1* | 2/2018 | Shimotsuma | G06V 20/58 |
| 2018/0158323 | A1* | 6/2018 | Takenaka | G06V 20/46 |
| 2018/0310242 | A1* | 10/2018 | Konishi | G08G 1/164 |
| 2018/0336780 | A1* | 11/2018 | Ran | G08G 1/0112 |
| 2018/0341821 | A1* | 11/2018 | Hovis | G08G 1/0968 |
| 2018/0342065 | A1* | 11/2018 | Hovis | G06V 10/25 |
| 2019/0028862 | A1* | 1/2019 | Futaki | H04W 4/44 |
| 2019/0096238 | A1* | 3/2019 | Ran | G08G 1/096725 |
| 2019/0132709 | A1* | 5/2019 | Graefe | G05D 1/028 |
| 2019/0208449 | A1* | 7/2019 | Wang | H04W 4/40 |
| 2019/0239155 | A1 | 8/2019 | Ushida et al. | |
| 2019/0244521 | A1* | 8/2019 | Ran | G08G 1/096775 |
| 2019/0311616 | A1* | 10/2019 | Jin | G05D 1/0297 |
| 2019/0340921 | A1* | 11/2019 | Ran | G08G 1/0133 |
| 2020/0058220 | A1* | 2/2020 | Oyabu | G08G 1/01 |
| 2020/0169838 | A1* | 5/2020 | Futaki | H04W 4/06 |
| 2021/0005085 | A1* | 1/2021 | Cheng | G08G 1/0141 |
| 2022/0044564 | A1* | 2/2022 | Zhang | G08G 1/096725 |
| 2022/0375337 | A1* | 11/2022 | Ran | G08G 1/0116 |
| 2022/0406175 | A1* | 12/2022 | Ran | G08G 1/0112 |
| 2023/0139242 | A1* | 5/2023 | Füreder | G08G 1/0116 340/933 |

FOREIGN PATENT DOCUMENTS

| | | |
|---|---|---|
| JP | 2012-100024 A | 5/2012 |
| JP | 2013-67365 A | 4/2013 |
| JP | 2018-18284 A | 2/2018 |
| WO | WO 2018/021116 A1 | 2/2018 |

OTHER PUBLICATIONS

International Search Report, issued in PCT/JP2018/021752, dated Aug. 21, 2018.
Notification of Reasons for Refusal, issued in the corresponding Japanese Application No. 2018-555790, dated Nov. 29, 2018.
Extended European Search Report for European Application No. 18921448.9, dated May 26, 2021.

* cited by examiner

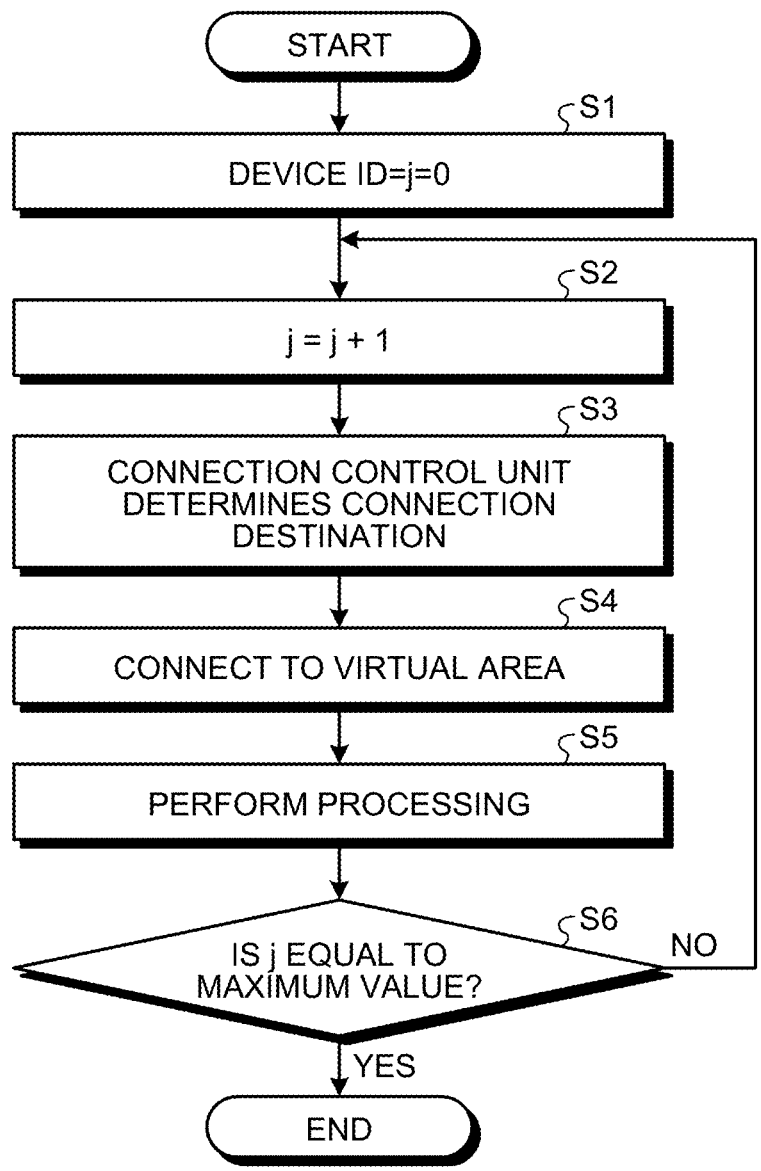

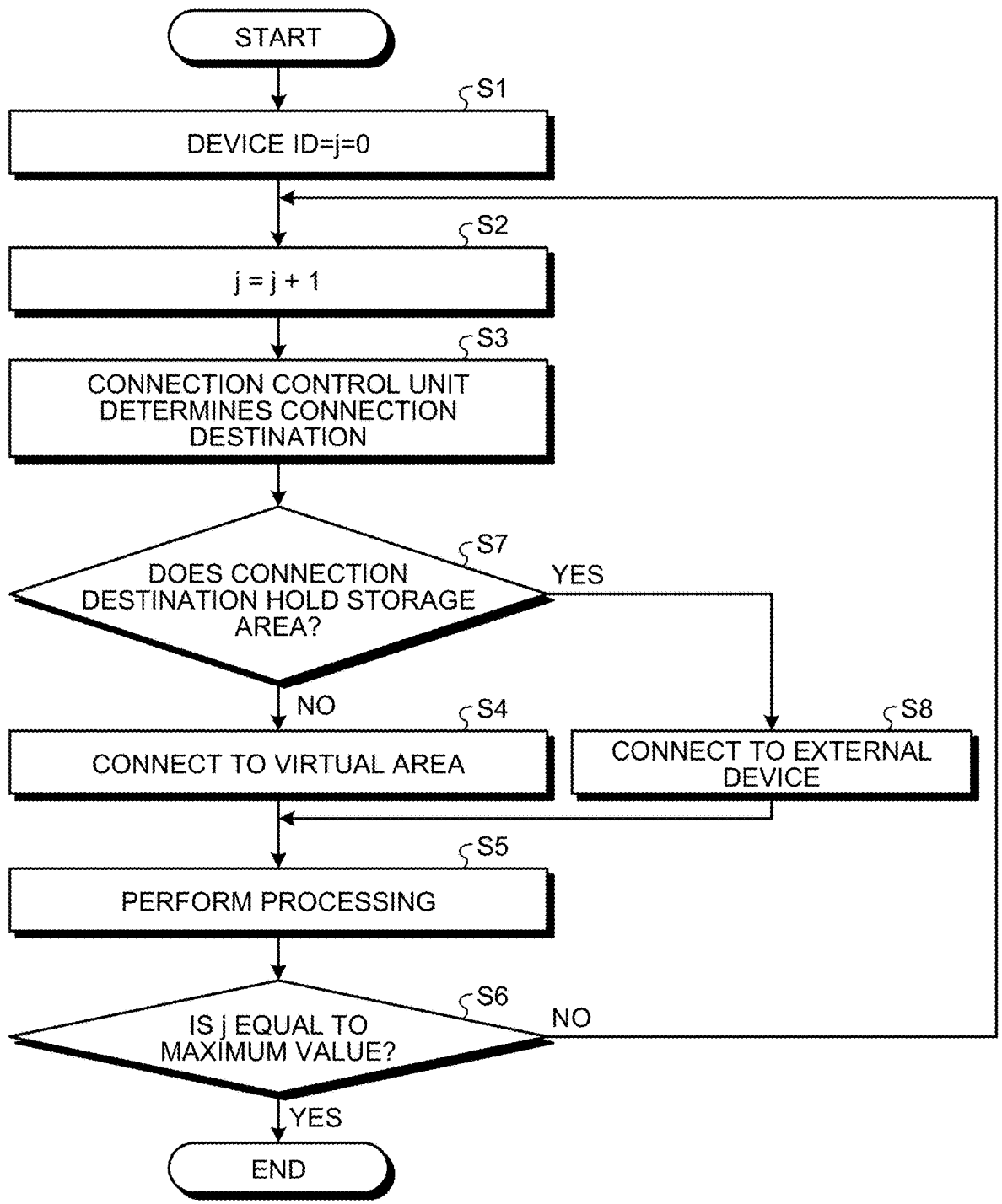

ROADSIDE INFORMATION PROCESSING SYSTEM

CROSS-REFERENCE TO RELATED APPLICATION

This application is a continuation application of International Application PCT/JP2018/021752, filed on Jun. 6, 2018, and designating the U.S., the entire contents of which are incorporated herein by reference.

BACKGROUND OF THE INVENTION

1. Field of the Invention

The present disclosure relates to a roadside information processing system that uses information obtained from a sensor or an in-vehicle device to generate information to be used by a vehicle.

2. Description of the Related Art

In recent years, in the field of transportation means such as automobiles and railways, research and development of driving assistance such as assistance for automated driving and assistance for safe driving have been actively performed. In order to provide the driving assistance described above, driving assistance information is needed such as identification results of objects including vehicles, pedestrians, or obstructions. The driving assistance information is generated by a vehicle and a roadside device. The vehicle and the roadside device have a device mounted thereon to obtain surrounding information, such as a sensor or camera. The vehicle and the roadside device generate driving assistance information on the basis of the surrounding information obtained by the sensor or camera. The surrounding information obtained by these devices, and the driving assistance information generated by the vehicle and the roadside device on the basis of the surrounding information are required to be obtained in real-time. These kinds of information are required to be information corresponding to the shape of the road, the traffic volume, or a change in the area where the vehicle is located. The shape of the road described herein indicates that the road is either straight or curved, or that the road is either a basic road section or at an intersection, or indicates the number of lanes on the road, indicates that the lanes are either wide or narrow, or indicates other conditions. It is desired to efficiently construct a roadside information processing system that satisfies these requirements. Roadside devices in ITS (Intelligent Transport Systems) have already been set up on the roadside. Each of the roadside devices is equipped with a communication device and other devices, and is used for distributing road traffic information or for electronic road pricing. It is efficient that a roadside information processing system that satisfies the requirements described above can be constructed by utilizing the systems having already been set up.

Patent Literature 1 discloses a roadside information processing system including a visible-light sensor included in a vehicle to capture an image pattern painted on a road in order that the vehicle communicates with a roadside device to perform handover processing at a proper timing, and a wireless communication device that determines that a cell corresponding to the image pattern is a handover destination cell. The cell refers to a communication range of a wireless base station in mobile communication.

CITATION LIST

Patent Literature

Patent Literature 1: Japanese Patent Application Laid-open No. 2003-319429

However, the roadside information processing system described in Patent Literature 1 cannot use the existing roadside devices, and instead roadside devices need to be newly provided. It is thus difficult to efficiently construct the roadside information processing system.

The present disclosure has been made in view of the above problems, and an object of the present disclosure is to provide a roadside information processing system in which the existing roadside devices can still be used.

SUMMARY OF THE INVENTION

There is provided a roadside information processing system according to the present disclosure including: a plurality of roadside devices installed on a roadside of a road and capable of communicating with a vehicle travelling on the road; and a plurality of sensors installed on the roadside to perform sensing on the road and a periphery thereof, wherein at least one of the roadside devices includes an edge-server processing unit to obtain first information from an in-vehicle device included in the vehicle and from some of the plurality of the sensors, the first information indicating information about a periphery of the vehicle and about the road and a periphery thereof, and to generate second information by using the first information, the second information indicating a position of the vehicle, a movement direction of the vehicle, and traffic jam conditions on the road.

BRIEF DESCRIPTION OF THE DRAWINGS

FIG. 6 is a flowchart illustrating operation of an edge processing unit and the adaptation unit according to the embodiment.

FIG. 7 is another flowchart illustrating operation of the edge processing unit and the adaptation unit according to the embodiment.

DETAILED DESCRIPTION OF THE PREFERRED EMBODIMENTS

A roadside information processing system according to an embodiment of the present disclosure will be described in detail below with reference to the accompanying drawings.

Embodiment

Figure 1:
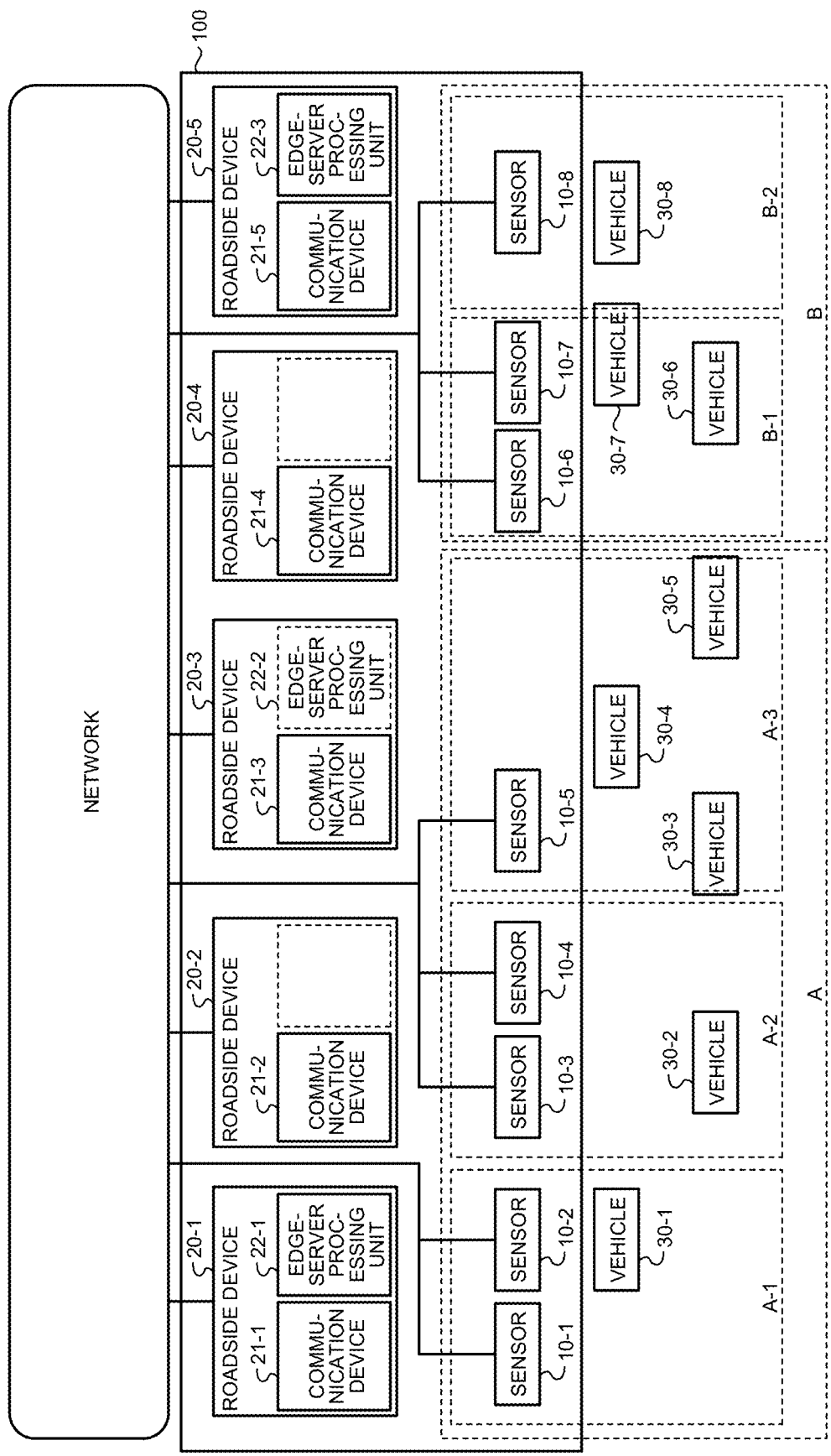
FIG. 1 is a diagram illustrating a roadside information processing system according to an embodiment.

FIG. 1 is a diagram illustrating a roadside information processing system according to an embodiment. A roadside information processing system 100 includes sensors 10-1 to 10-8 and roadside devices 20-1 to 20-5. The sensors 10-1 to 10-8 are collectively referred to as "sensor 10" when the sensors 10-1 to 10-8 are described without being distinguished from each other. Each of the roadside devices 20-1 to 20-5 is collectively referred to as "roadside device 20" when the roadside devices 20-1 to 20-5 are described without being distinguished from each other. The sensor 10 and the roadside devices 20 are connected to each other through a network. The network connects to a central management device (not illustrated). The sensor 10 performs sensing to identify objects such as a vehicle 30, pedestrians, or obstructions around the sensor 10, and to monitor the road conditions, and transmits sensor information generated as results of the sensing to the roadside device 20.

The roadside devices 20-1 to 20-5 include communication devices 21-1 to 21-5, respectively. Each of the communication devices 21-1 to 21-5 is collectively referred to as "communication device 21" when the communication devices 21-1 to 21-5 are described without being distinguished from each other. The communication device 21 communicates with vehicles 30-1 to 30-8 that are present in a communication available area. The communication available area for the communication device 21-1 is an area A-1. The communication available area for the communication device 21-2 is an area A-2. Similarly, the communication available areas for the communication device 21-3, the communication device 21-4, and the communication device 21-5 are an area A-3, an area B-1, and an area B-2, respectively. For example, the vehicle 30-1 is present in the area A-1. An area combining the area A-1, the area A-2, and the area A-3 is referred to as "area A". An area combining the area B-1 and the area B-2 is referred to as "area B". The vehicles 30-1 to 30-8 are collectively referred to as "vehicle 30" when the vehicles 30-1 to 30-8 are described without being distinguished from each other. The vehicle 30 includes an in-vehicle device having a communication function. The in-vehicle device includes an in-vehicle sensor, and uses the in-vehicle sensor to perform sensing in the same manner as the sensor 10 so as to generate in-vehicle sensor information. The sensor information and the in-vehicle sensor information are also referred to as "first information". The communication device 21 collects the in-vehicle sensor information from the vehicle 30 that is present in the communication available area for the communication device 21. While the present embodiment describes eight sensors 10, the number of the sensors 10 is not limited to eight. While the present embodiment describes five roadside devices 20, the number of the roadside devices 20 is not limited to five.

The roadside device 20-1 includes an edge-server processing unit 22-1. Similarly, the roadside device 20-3 and the roadside device 20-5 include an edge-server processing unit 22-2 and an edge-server processing unit 22-3, respectively. Each of the edge-server processing units 22-1 to 22-3 is collectively referred to as "edge-server processing unit 22" when the edge-server processing units 22-1 to 22-3 are described without being distinguished from each other. At least one of the roadside devices 20 includes the edge-server processing unit 22. The edge-server processing unit 22 is implemented by application software additionally installed in a roadside device 20 already existing. The edge-server processing unit 22 is not always included in all the roadside devices 20, but is included in some selected roadside devices 20. The roadside device 20 in which the edge-server processing unit 22 is to be included is selected on the basis of the geographical positions of the areas A-1 to B-2, the shape of the road, the installation positions of the sensors 10, the number of the sensors 10 installed, and other conditions. Selection of which of the roadside devices 20 includes the edge-server processing unit 22 is described later in detail.

The edge-server processing unit 22-1 collects in-vehicle sensor information collected by the communication devices 21-1 to 21-3, and sensor information generated by the sensors 10-1 to 10-5, and then processes, in real-time, these pieces of information into information on the position of the vehicle 30 in and around the area A, information on the movement direction of this vehicle 30, and information on the traffic jam conditions on the road. The information processed by the edge-server processing unit 22-1 is transmitted to the roadside devices 20-1 to 20-3, and transmitted to the vehicles 30-1 to 30-5 that are present in the areas A-1 to A-3 for the communication devices 21-1 to 21-3, respectively. The information processed by the edge-server processing unit 22-1 is also referred to as "second information". Similarly, the edge-server processing unit 22-3 collects in-vehicle sensor information collected by the communication device 21-4 and the communication device 21-5, and sensor information generated by the sensors 10-6 to 10-8, and then processes, in real-time, these pieces of information into information on the position of the vehicle 30 in and around the area B, information on the movement direction of this vehicle 30, and information on the traffic jam conditions on the road. The processing to be performed by the edge-server processing unit 22 is general processing which is performed by, for example, Intersection Collision Risk Warning (ICRW) application or Longitudinal Collision Risk Warning (LCRW) application. The information processed by the edge-server processing unit 22-3 is transmitted to the roadside device 20-4 and the roadside device 20-5, and transmitted to the vehicles 30-6 to 30-8 that are present in the area B-1 and the area B-2 for the communication device 21-4 and the communication device 21-5, respectively. In FIG. 1, the edge-server processing unit 22-2 included in the roadside device 20-3 is in a standby state and thus does not operate.

Figure 2:
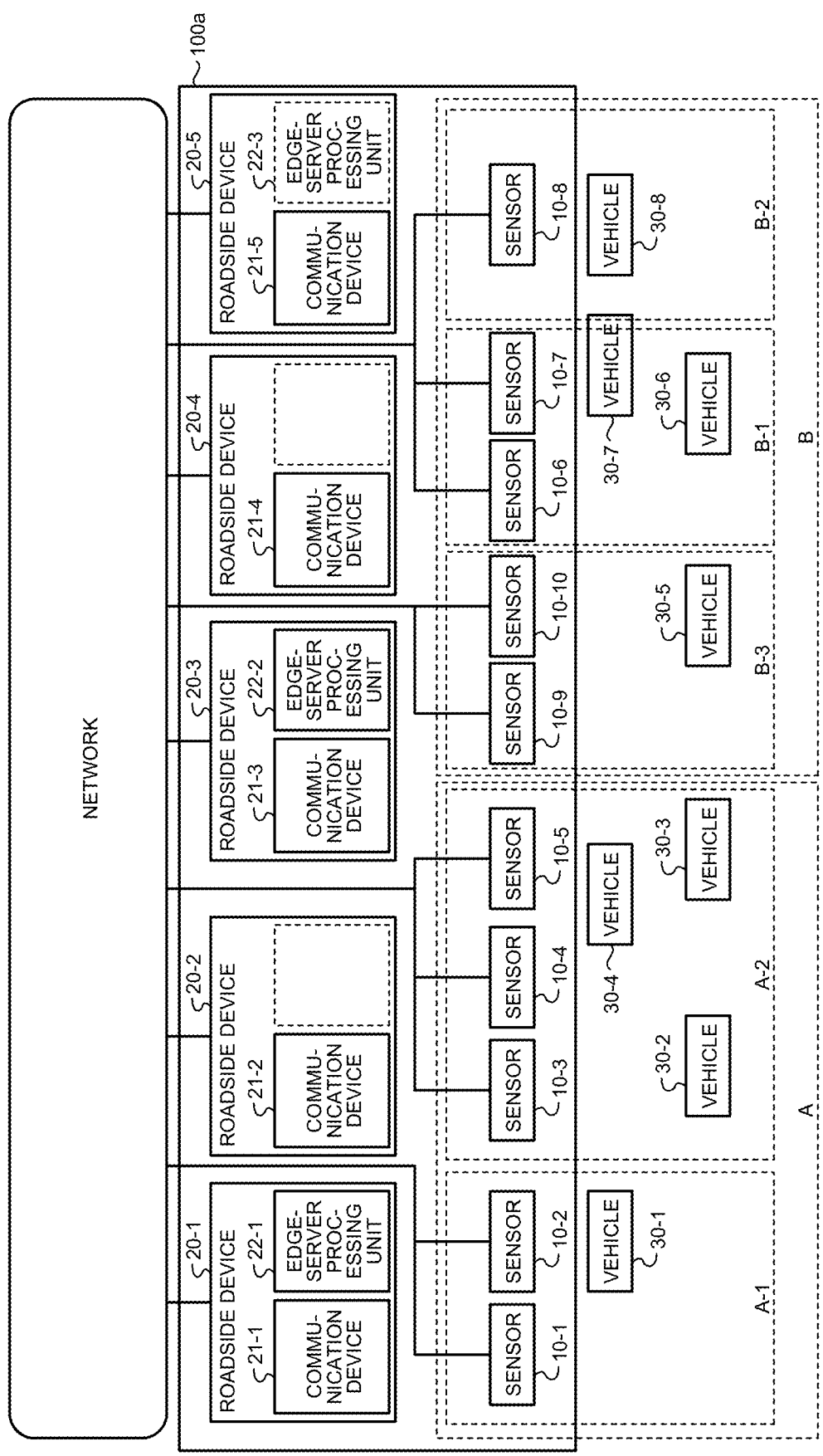
FIG. 2 is a diagram illustrating another example of the roadside information processing system according to the embodiment.

FIG. 2 is a diagram illustrating another example of the roadside information processing system according to the embodiment. A roadside information processing system 100a is different in configuration from the roadside information processing system 100 in FIG. 1 in that a sensor 10-9 and a sensor 10-10 are added near the roadside device 20-3 and the roadside device 20-4. In the roadside information processing system 100a, the communication available area for the communication device 21-3 included in the roadside device 20-3 is defined as an area B-3. An area combining the area B-1, the area B-2, and the area B-3 is defined as the area B which is enlarged relative to the area B in the roadside information processing system 100. The edge-server processing unit 22-2 performs processing in the area B. In association with the enlargement of the area B, the area A is defined as an area only combining the area A-1 and the area A-2, and the edge-server processing unit 22-1 performs processing in the area A. As described above, in which of the roadside devices 20 the edge-server processing unit 22 is included is determined by, or which of the edge-server processing units 22 is activated is determined by, the number of the sensors 10 installed and the installation positions of the sensors 10. FIGS. 1 and 2 illustrate the configuration of the roadside information processing system, assuming that the sensors 10 are installed on the periphery of the road. However, even in a case where the sensors 10 are not installed and the edge-server processing unit 22 deals with only in-vehicle sensor information from the vehicle 30, it is still possible to select the edge-server processing unit 22 to be installed or used, on the basis of the shape of the road and other conditions. In which of the roadside devices 20 the edge-server processing unit 22 is included is determined by the shape of the road in some cases. Examples of this determination include the case where the traveling area for the vehicle 30 becomes wider due to the increase in the number of lanes on the road and accordingly the edge-server processing unit 22 to be installed is determined in view of the wider area. FIG. 2 illustrates an example in which the number of the sensors 10 is increased. However, even in a case where the number of the roadside devices 20 is increased, it is still possible to select the edge-server processing unit 22 to be installed or used.

Figure 3:
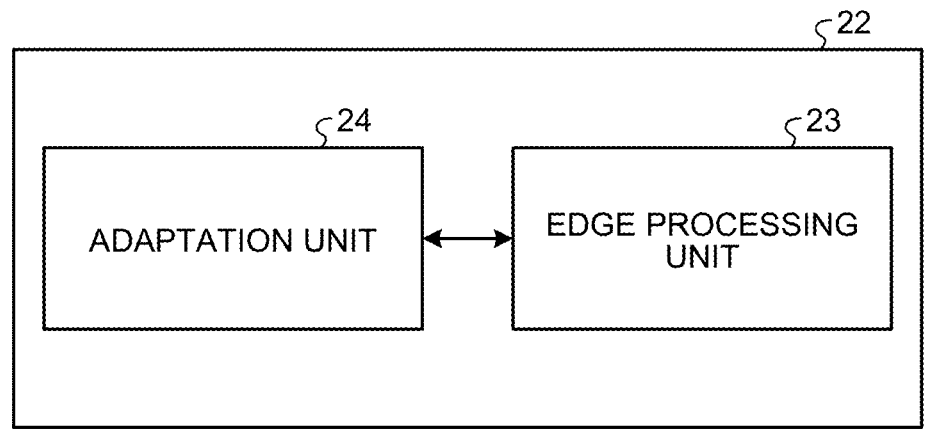
FIG. 3 is a diagram illustrating a functional block of an edge-server processing unit according to the embodiment.

FIG. 3 is a diagram illustrating the functional block of the edge-server processing unit 22 according to the embodiment. The edge-server processing unit 22 includes an edge processing unit 23 and an adaptation unit 24. The edge processing unit 23 connects to an in-vehicle device included in the vehicle 30 or connects to the sensor 10 to obtain in-vehicle sensor information or sensor information. The adaptation unit 24 assists the edge processing unit 23 in obtaining the in-vehicle sensor information and the sensor information.

Figure 4:
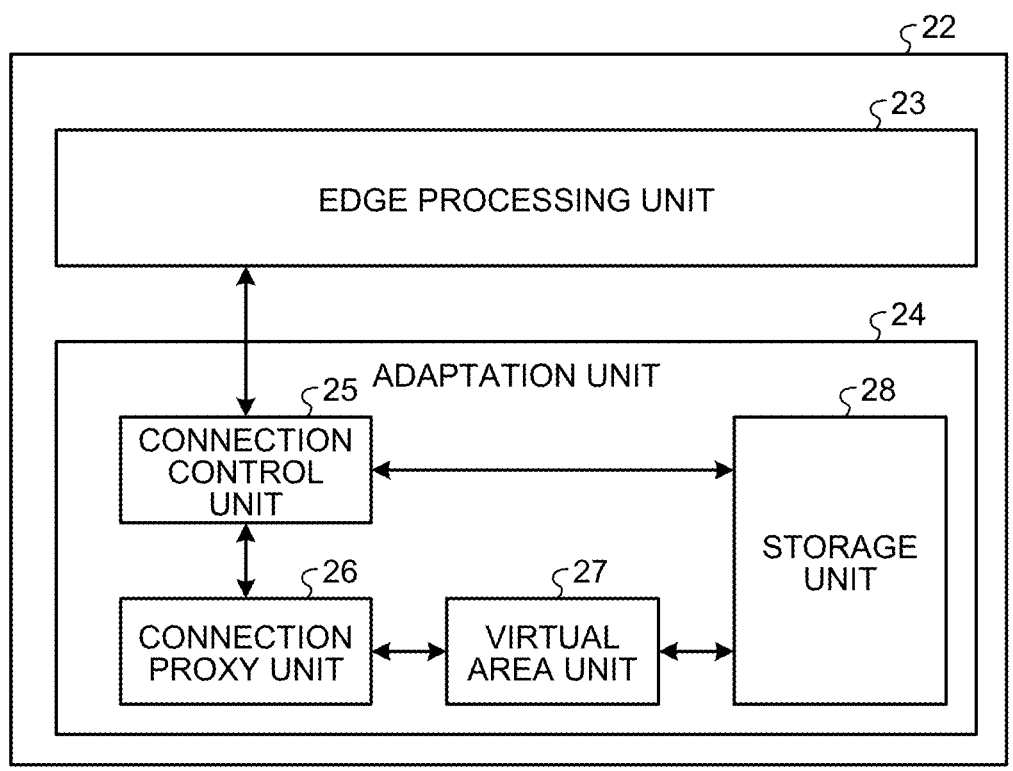
FIG. 4 is a diagram illustrating a functional block of an adaptation unit according to the embodiment.

FIG. 4 is a diagram illustrating the functional block of the adaptation unit 24 according to the embodiment. The adaptation unit 24 includes a connection control unit 25, a connection proxy unit 26, a virtual area unit 27, and a storage unit 28. The connection control unit 25 determines a connection destination for the edge processing unit 23 and the type of the connection destination, and controls the order in which the edge processing unit 23 connects to the in-vehicle device or the sensor 10 to obtain in-vehicle sensor information and sensor information. When the connection control unit 25 determines that the connection destination for the edge processing unit 23 is the sensor 10, the connection proxy unit 26 obtains sensor information from a virtual area. The connection proxy unit 26 transmits the sensor information to the edge processing unit 23. The virtual area unit 27 generates a virtual area in the storage unit 28 to save the sensor information obtained by the connection proxy unit 26. The storage unit 28 holds the virtual area in which the sensor information is saved.

The edge processing unit 23 and the adaptation unit 24 according to the embodiment are implemented by processing circuitry that is electronic circuitry that performs each process.

It is allowable that this processing circuitry is either dedicated hardware, or control circuitry including a memory and a CPU (Central Processing Unit) that executes a program stored in the memory. For example, the memory described herein is a nonvolatile or volatile semiconductor memory such as a RAM (Random Access Memory), a ROM (Read Only Memory), or a flash memory, or is a magnetic disk or an optical disk. In a case where this processing circuitry is control circuitry including the CPU, this control circuitry is, for example, control circuitry 200 that is configured as illustrated in FIG. 5.

Figure 5:
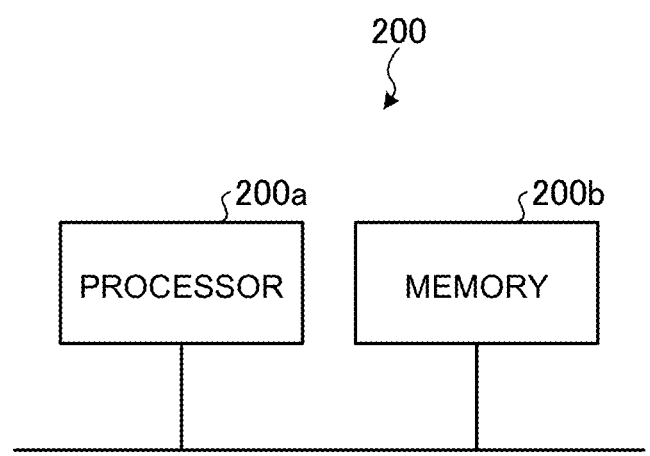
FIG. 5 is diagram illustrating control circuitry according to the embodiment.

As illustrated in FIG. 5, the control circuitry 200 includes a processor 200a that is the CPU, and a memory 200b. In a case where the processing circuitry is implemented by the control circuitry 200 illustrated in FIG. 5, the processor 200a reads and executes a program that is stored in the memory 200b and that corresponds to each process, thereby implementing the processing circuitry. The memory 200b is also used as a temporary memory for the processor 200a to perform each process.

FIG. 6 is a flowchart illustrating operation of the edge processing unit 23 and the adaptation unit 24 according to the embodiment. FIG. 6 illustrates the case where the edge processing unit 23 obtains sensor information from the sensor 10. Only a small number of the sensors 10 include a memory in themselves, and most of the sensors 10 transmit sensor information indicating data sensed by the sensors 10 without saving the sensor information. For this reason, the sensor information is held in the storage unit 28 included in the adaptation unit 24, and is processed virtually as if the edge processing unit 23 has obtained the sensor information from the sensor 10.

The edge processing unit 23 initializes "j" that indicates the value of a device ID (Identification) to 0 (Step S1). The device ID is a value uniquely assigned to a device such as the sensor 10 and an in-vehicle device from which the edge processing unit 23 obtains the first information. For example, the sensor 10-1 is assigned with 1 as the device ID, and the sensor 10-2 is assigned with 2 as the device ID. The edge processing unit 23 increments the value of "j" by 1 (Step S2). The edge processing unit 23 obtains the first information from a device in accordance with the value of "j". At this time, the connection control unit 25 determines a connection destination for the edge processing unit 23. When the connection control unit 25 determines that the connection destination is a device that cannot hold therein sensor information such as the sensor 10, the connection control unit 25 notifies the connection proxy unit 26 of information indicating that the connection destination is a device that cannot hold therein sensor information, and causes the connection proxy unit 26 to obtain sensor information from the virtual area (Step S3). As an example of the determination method for the connection control unit 25 regarding whether the device can hold therein data, information on whether the device can save therein data is held in the storage unit 28 for each device ID, and the connection control unit 25 refers to this information and thereby performs the determination.

The connection proxy unit 26 obtains the sensor information generated by the sensor 10 from the virtual area generated in the storage unit 28, and transmits the sensor information generated by the sensor 10 to the edge processing unit 23 via the connection control unit 25 (Step S4). At this time, the connection proxy unit 26 transmits the sensor information to the edge processing unit 23, so that even when the edge processing unit 23 accesses a device that does not hold a storage area, such as the sensor 10, the edge processing unit 23 can still receive the sensor information from the connection proxy unit 26, and can thus operate in the same manner as the case where the sensor 10 holds a storage area. The edge processing unit 23 performs real-time processing by using the received sensor information (Step S5). When the value of the device ID is not the maximum value (NO at Step S6), the processing returns to Step S2. When the value of the device ID is the maximum value (YES at Step S6), the processing ends. The maximum value of the device ID is a maximum value of the number of devices to be handled by the edge processing unit 23. It is allowable that the edge processing unit 23 performs real-time processing at a timing after the edge processing unit 23 has completely received the first information from all the devices.

FIG. 7 is another flowchart illustrating operation of the edge processing unit 23 and the adaptation unit 24 according to the embodiment. FIG. 7 includes a process of obtaining the first information from an external device holding a storage area, such as an in-vehicle device. As compared to FIG. 6, Steps S7 and S8 are added to FIG. 7. Steps S1 to S6 are the same as those in FIG. 6. After Step S3, when the connection destination for the edge processing unit 23 is an external device holding a storage area, such as an in-vehicle device (YES at Step S7), the connection control unit 25 does not change the connection destination for the edge processing unit 23, and then the edge processing unit 23 connects to the external device that is the in-vehicle device to obtain in-vehicle sensor information (Step S8). When the connection destination is not an external device holding a storage area, such as an in-vehicle device (NO at Step S7), the processing advances to Step S4.

As explained above, in the present embodiment, it is possible to implement the edge-server processing unit 22 in accordance with the shape of the road or the installation conditions of a device such as the sensor 10. All the roadside devices 20 do not necessarily include the edge-server processing unit 22. Because the edge-server processing unit 22 is implemented by being additionally installed in the existing roadside device, the existing roadside device can still be used. This makes it possible to perform real-time processing and distribute information at minimum cost. A standby edge-server processing unit 22 may be implemented in advance in accordance with plans for the future addition or deletion of facilities such as the sensors 10, or in accordance with road reconstruction, so that it is possible to flexibly accommodate the system change.

The edge-server processing unit 22 includes the edge processing unit 23 and the adaptation unit 24, and the adaptation unit 24 includes a virtual area in the storage unit 28 for holding sensor information generated by the sensor 10. Due to this configuration, the edge processing unit 23 can obtain information from a device that does not hold a storage area. Further, an information distribution system related to driving assistance can be constructed by using the existing facilities or application, such as the roadside device 20 and the existing application already installed in the roadside device 20, as well as ITS-related devices or the network that connects these ITS-related devices. This can therefore reduce capital investment.

The roadside information processing system according to the present disclosure has an effect where the existing roadside devices can still be used.

The configurations described in the above embodiment are only examples. The configurations can be combined with other well-known techniques, and part of each of the configurations can be omitted or modified without departing from the scope.

What is claimed is:

1. A roadside information processing system comprising:
a plurality of roadside devices installed on a roadside of a road and capable of communicating with a vehicle travelling on the road; and
a plurality of sensors installed on the roadside to perform sensing on the road and a periphery thereof, wherein
at least one of the roadside devices includes processing circuitry to perform edge-server processing to obtain first information from an in-vehicle device included in the vehicle and from some of the plurality of sensors, the first information indicating information about a periphery of the vehicle and about the road and a periphery thereof, and to generate second information by using the first information, the second information indicating a position of the vehicle, a movement direction of the vehicle, and traffic jam conditions on the road,
the processing circuitry is configured
to connect to some of the plurality of roadside devices or some of the plurality of sensors,
to determine a connection destination and to determine whether the connection destination is some of the plurality of sensors configured to output the first information without holding the first information therein,
to generate a virtual area for holding sensor information indicating information sensed and generated by each of said some of the plurality of sensors, and
to obtain the sensor information for each of said some of the plurality of sensors from the virtual area, and to transmit the sensor information.

2. The roadside information processing system according to claim 1, wherein
when the processing circuitry determines that a connection destination is the in-vehicle device, the processing circuitry obtains in-vehicle sensor information from the in-vehicle device, the in-vehicle sensor information being information sensed and generated by an in-vehicle sensor included in the vehicle, and
the first information includes the in-vehicle sensor information.

3. The roadside information processing system according to claim 1, wherein the processing circuitry is implemented by a processor and a memory, and a program for edge-server processing is installed in the memory in addition to existing application software included in a roadside device.

4. The roadside information processing system according to claim 2, wherein the processing circuitry is implemented by a processor and a memory, and a program for edge-server processing is installed in the memory in addition to existing application software included in a roadside device.

5. The roadside information processing system according to claim 1, wherein the at least one of the roadside devices which includes the processing circuitry, is selected from among a plurality of roadside devices, on a basis of a shape of the road, positions of the sensors, and positions of the roadside devices.

6. The roadside information processing system according to claim 2, wherein the at least one of the roadside devices which includes the processing circuitry, is selected from among a plurality of roadside devices, on a basis of a shape of the road, positions of the sensors, and positions of the roadside devices.

7. The roadside information processing system according to claim 1, wherein from which of the plurality of roadside devices and from which of the plurality of sensors the processing circuitry obtains the first information, are determined by a shape of the road, positions of the roadside devices, and positions of the sensors.

8. The roadside information processing system according to claim 2, wherein from which of the plurality of roadside devices and from which of the plurality of sensors the processing circuitry obtains the first information, are determined by a shape of the road, positions of the roadside devices, and positions of the sensors.

9. The roadside information processing system according to claim 3, wherein from which of the plurality of roadside devices and from which of the plurality of sensors the processing circuitry obtains the first information, are determined by a shape of the road, positions of the roadside devices, and positions of the sensors.

10. The roadside information processing system according to claim 4, wherein from which of the plurality of roadside devices and from which of the plurality of sensors the processing circuitry obtains the first information, are determined by a shape of the road, positions of the roadside devices, and positions of the sensors.

11. The roadside information processing system according to claim 5, wherein from which of the plurality of roadside devices and from which of the plurality of sensors the processing circuitry obtains the first information, are determined by a shape of the road, positions of the roadside devices, and positions of the sensors.

12. The roadside information processing system according to claim 6, wherein from which of the plurality of roadside devices and from which of the plurality of sensors the processing circuitry obtains the first information, are determined by a shape of the road, positions of the roadside devices, and positions of the sensors.

13. The roadside information processing system according to claim 1, wherein whether the processing circuitry is activated is determined by a shape of the road, positions of the sensors, and positions of the roadside devices.

* * * * *